(12) United States Patent
Hirshi et al.

(10) Patent No.: US 6,700,333 B1
(45) Date of Patent: Mar. 2, 2004

(54) TWO-WIRE APPLIANCE POWER CONTROLLER

(75) Inventors: Stanley S. Hirshi, El Paso, TX (US); David C. Nemir, El Paso, TX (US)

(73) Assignee: X-L Synergy, LLC, El Paso, TX (US)

( * ) Notice: Subject to any disclaimer, the term of this patent is extended or adjusted under 35 U.S.C. 154(b) by 218 days.

(21) Appl. No.: 09/692,892

(22) Filed: Oct. 19, 2000

Related U.S. Application Data (60) Provisional application No. 60/160,275, filed on Oct. 19, 1999.

(51) Int. Cl.$^7$ .................................................. G05F 1/00
(52) U.S. Cl. ..................... 315/291; 307/41; 307/115
(58) Field of Search ............................... 315/291, 307, 315/219, 211, 323; 307/125, 41, 115, 132 R, 132 E; 361/101, 100; 340/80, 81

(56) References Cited

U.S. PATENT DOCUMENTS

| | | | | |
|---|---|---|---|---|
| 3,646,438 A | * | 2/1972 | Staff | 324/73 R |
| 3,979,601 A | | 9/1976 | Franklin | 307/141 |
| 4,199,694 A | | 4/1980 | Van Zeeland | 307/252 |
| 4,215,277 A | * | 7/1980 | Weiner et al. | 307/41 |
| 4,276,486 A | | 6/1981 | Ahuja et al. | 307/252 B |
| 4,504,778 A | | 3/1985 | Evans | 323/323 |
| 4,634,957 A | | 1/1987 | Hollaway | 323/247 |
| 4,668,877 A | | 5/1987 | Kunen | 307/116 |
| 4,689,547 A | | 8/1987 | Rowen et al. | 323/239 |
| 4,695,739 A | | 9/1987 | Pierce | 307/141 |
| 4,799,126 A | * | 1/1989 | Kruse et al. | 361/101 |
| 5,030,890 A | | 7/1991 | Johnson | 315/208 |
| 5,359,231 A | * | 10/1994 | Flowers et al. | 307/125 |
| RE35,220 E | | 4/1996 | Johnson | 315/208 |
| 5,504,394 A | | 4/1996 | Johnson | 315/71 |
| 5,504,395 A | | 4/1996 | Johnson et al. | 315/71 |
| 5,731,664 A | | 3/1998 | Posa | 315/194 |
| 5,753,983 A | | 5/1998 | Dickie et al. | 307/141.4 |
| 5,798,581 A | | 8/1998 | Keagy et al. | 307/115 |
| 5,798,620 A | | 8/1998 | Wacyk et al. | 315/307 |
| 5,861,720 A | | 1/1999 | Johnson | 315/291 |
| 5,861,721 A | | 1/1999 | Johnson | 315/291 |
| 5,869,954 A | | 2/1999 | Kurz | 323/237 |
| 5,880,578 A | | 3/1999 | Oliveira et al. | 323/235 |
| 5,889,369 A | | 3/1999 | Roy | 315/51 |
| 5,943,198 A | * | 8/1999 | Hirsh et al. | 361/42 |
| 5,955,847 A | | 9/1999 | Rothenbuhler | 315/289 |

* cited by examiner

*Primary Examiner*—Don Wong
*Assistant Examiner*—Jimmy T. Vu
(74) *Attorney, Agent, or Firm*—Jeffrey D. Myers; Vidal A. Oaxaca (57) ABSTRACT

A power level controller and method for an AC electrical appliance that can be implemented in the plug of the appliance, controlling power in response to switch closures on the appliance and/or remotely located switches, or alternatively, may be implemented as a module into which an existing appliance is inserted, thereby providing a retrofit solution for appliance control. By using multifunction switches having steering diodes, multiple commands can be transmitted to the controller, all without the need for additional control wires, since all commands are superimposed on the two conductors that deliver power to the appliance. In addition, the independent control of two polarity sensitivity loads may be implemented. With implementations using integrated circuits, the internal electrostatic discharge diodes within the integrated circuit may be used for the power supply to yield a very low parts count system.

21 Claims, 10 Drawing Sheets

TWO-WIRE APPLIANCE POWER CONTROLLER

CROSS REFERENCE TO RELATED APPLICATIONS

This application claims the benefit of the filing of U.S. Provisional Patent Application Serial No. 60/160,275, entitled "Two Wire Appliance Phase Controller", filed on Oct. 19, 1999, and the specification thereof is incorporated herein by reference.

BACKGROUND OF THE INVENTION

1. Field of the Invention

The present invention relates to a low cost, compact electronic circuit that may be built into the electrical cord of a two wire AC electrical appliance and that implements different levels and schedules of power application based upon control signals provided from either a switch that is remotely located in the appliance and/or a switch that is remotely located at a location on the source side of the electric cord. An alternative implementation is built into a plug-in adapter that connects between a conventional wall outlet and into which a lamp or other appliance may be attached, thereby implementing power level control as determined by the number and timing of on/off switch closures from a remote switch. The invention also encompasses the use of internal electrostatic protection diodes in a CMOS based integrated circuit to power that circuit, thereby producing a minimal-parts-count circuit.

2. Background of the Invention

For AC electrical appliances such as curling irons, heaters, or electric blankets, that incorporate heating elements, a simple two position, ON/OFF switch is commonly used for power control. Such a switch is also common in incandescent lamps, where in the ON position, electrical current is allowed to pass to the lamp, thereby creating full brightness and in the OFF position, no electrical current is allowed to flow to the lamp, thereby turning off the light. A two position, ON/OFF switch, is also used in many electrical loads that incorporate motors. An example is electric fans. If the switch is ON, the fan operates at full speed. If the switch is OFF, no power is delivered to the fan motor and the fan is off.

In many applications, it is desirable to have more than just ON/OFF control. For example, in an electric blanket, it is desirable to have multiple levels of heating in order to adjust for the external air temperature and user preference. In a light, a low lighting level might be desirable to save energy or to set a mood while higher levels would be preferable for reading. For a fan, different fan speeds might be desirable depending upon room size and room temperature.

Different levels of appliance control may often be obtained by modifying the appliance. Many of these alternatives involve a more complicated switch, additional wiring, and/or modifications to the appliance. For example, in the U.S., many lamps are sold that have a so-called three-way socket. Such a lamp socket has three contacts designed to connect to an incandescent light bulb. The outer contact is neutral. There are two inner "hot" contacts. A three-way switch is provided on the socket. In the first position it supplies power to one of the hot contacts, in the second position it supplies power to the second of the hot contacts. In the third position it supplies power to both hot contacts. In a fourth position it is off and no power is applied to the bulb. A special "three way" bulb that is commercially available may then be used with the three-way socket to achieve multiple levels of lighting. A three-way bulb has two hot contacts with filaments connecting between each of these hot contacts to a third contact, the "neutral", which is typically connected to the outer ring on the incandescent bulb. Depending upon which hot contacts are energized, either, both or neither of the filaments within the three-way bulb may be energized, consequently providing differing levels of lighting. The problem with this approach to multi-level lighting is that only three levels of brightness are typically provided, the socket is special and must be built into the lamp, and special three way bulbs must be purchased and these are expensive relative to conventional incandescent bulbs.

In a fan, speed control may be obtained by having multiple windings on the fan motor coils and by a multiple position switch, switching between different windings to vary the motor field and thereby vary the fan speed. A multiple position switch is more complicated than a two position switch and a motor that has multiple windings to implement multiple speeds is more complicated than a simple motor having a single set of magnetic field windings or an internally connected field.

There are commercially available lamp dimmers that provide a variable appliance control and that can be installed as a retrofit. These are often sold as a plug-in wall module, into which the consumer plugs an incandescent lamp or other appliance. A potentiometer (which is a type of switch that gives a range of resistance values depending upon its mechanical position) in the dimmer module allows the user to control the power level over a wide range. Power control is then achieved by the phase control of a thyristor, a type of solid state electronic AC switch that turns on in response to a voltage applied at the so-called gate terminal.

Thyristors have the advantage that they are latching. That is, once turned on or fired, even in the absence of additional gate excitation, a thyristor will continue to conduct electrical current until the current flow through the device reduces to zero. A type of thyristor called a triac may be used for a bidirectional AC switch and has three terminals: MT1, MT2 and gate. The MT1 and MT2 terminals act as the two terminals of an AC switch. The voltage signal applied to the gate of a triac, the so-called gate pulse, may be classified according to one of four possible operating modes: quadrant I, II, III, or IV. When the gate pulse is in-phase with the AC line, then the triac is said to use quadrant I operation for positive going current flow (gate pulse is positive and current flows from MT2 to MT1) and quadrant III operation for negative going current flow (gate pulse is negative and current flows from MT1 to MT2). In quadrant II operation, the gate pulse is negative for positive current flow and in quadrant IV, the gate pulse is positive for negative current flow. Although any of the four quadrant operations may be used to fire a thyristor, quadrant I,II and III operation is much preferred because it takes substantially less electrical current to obtain a reliable triggering. Quadrant IV operation requires much higher gate currents to trigger the thyristor.

The disadvantage to potentiometer based dimmers is that they are often not convenient to control because a potentiometer that is mounted in the module at the wall outlet may not be easily accessible. Other products are designed to attach midway in the electrical cord, allowing the consumer to more easily control power levels but also requiring the user to make a more extensive (and permanent) modification to the cord. By contrast, the present invention does not require the introduction of additional switches into the lighting control but uses the existing switches. Furthermore, it can be built into a cordset at the manufacturing point, or it can be added at a later date as a module type of device that is portable among multiple appliances.

U.S. Pat. No. 3,979,601 to Franklin discloses a combination dimmer and timer switch mechanism which connects to the AC line and which implements appliance dimming in accordance with a predetermined timing sequence. A phase-controlled thyristor is used to regulate the appliance power. This system is fundamentally designed to be an open loop system without requiring user feedback for control and utilizes a complicated mechanical switch.

U.S. Pat. No. 4,276,486 to Ahuja et al. discloses a two terminal power controller whereby momentary interruptions of the AC supply are used to signal building lights to change state (if on, to turn off, if off, to turn on). The intent is to allow both a distributed control where each light may be individually turned on, or a global control where all lights may be turned on or off.

U.S. Pat. No. 4,504,778 to Evans discloses a self-powered electronic control system wherein the control circuitry is powered directly off the AC line and wherein momentary power loss events are sensed and are used as inputs to the control scheme. In this system, the voltage drop across the switching device is used to provide power to the control circuitry. This is known as parasitic power. There are problems with using parasitic power. One problem is that the switching device can never be put into a fully on condition but must remain off for a portion of each half cycle so as to supply power to the control circuitry. This can result in undesirable electrical noise imposed upon the AC power line because of the required phase delay. A second disadvantage with parasitically powered devices is that because the entire control circuit is attached in electrical series with the load, a relatively complicated control circuit is required to distinguish between the positive half cycle and the negative half cycle of the AC power as applied to the load. A parasitically powered controller that is series connected with the load cannot distinguish between a switch at the load and a switch at the source. This limits the ability to implement multiple control schemes. Another problem with parasitic power is that the load must be substantially resistive. This is because the control scheme relies upon the voltage and current waveforms being in-phase in order to sense switch closures. A parasitically powered device can only control a thyristor by firing quadrants I and IV. Finally, because the parasitically powered device derives its own power by being electrically in series with the load, it must power the load in order to power itself. This means that when the load is turned off, as through an open switch, power is removed from the controller. Also, this means that the load must have some specific minimum value or else the controller would not receive enough power to operate.

U.S. Pat. No. 4,534,957 to Hollaway discloses a remotely controlled light flasher for an outside building light. This invention describes a control circuit for turning on and off the power to an electrical load with a prescribed timing characteristic.

U.S. Pat. No. 4,695,739 to Pierce discloses a multifunction switch-controlled lamp circuit whereby the number of contact closures of a single pole, single throw switch that occur within a pre-specified time interval are counted and interpreted and then used to control power to a load. The control circuit is parasitically powered and has the problems associated with that design approach.

U.S. Pat. No. 5,030,890 to Johnson discloses a two terminal incandescent lamp controller that is connected in electrical series with a load and a remote switch and that is disposed in a package that is inserted in the base of an Edison style lamp socket. Contact closures at the remote switch are counted and power to a load is controlled at an electronic switching device in response thereto. This control scheme is half cycle parasitically powered and exhibits the problems associated with that design approach. The packaging can present a problem because a user must install the package into the lamp socket and must replace the package with each new bulb. Furthermore, having this package located under a bulb severely limits the ability of the thyristor to dissipate internally generated heat and limits the amperage of the lamp load that can be attached.

U.S. Pat. No. 5,844,759 to Hirsh et al. discloses an electrical shock protection device for appliances that may be built into the plug of an appliance cordset and that may communicate fault or other status information to a remote location over a two-wire power line.

The present invention is of a low cost electronic circuit that may be used to control power levels in an electrical appliance without requiring a special socket, special switches, or modification to the appliance. The invention is powered from a parallel connection to the AC line (no parasitic powering) and is preferably mounted entirely within the plug of an electric cord but may be also be implemented as a plug-in module, as an extension cord, or as a two part system with a control that is distributed between plug and a secondary controller located between plug and appliance. Using this invention, appliance control may be initiated in one of two ways. First, by interrupting the power to the appliance by a momentary toggling of a switch that is external to the appliance, for example a wall outlet that is controlled by a wall switch. Second, by the toggling of a switch located at the appliance. In many cases, this switch could be a simple ON/OFF or single pole, single throw switch, in which case the timing and sequence of switch closures would be interpreted so as to effect a control action. In other cases, the switch could be a more complicated single pole, multiple throw switch, in which case steering diodes would be used to distinguish between different switch settings, allowing the recognition of more complicated control requests. In all cases, the preferred embodiment of this invention is as applied to a two wire appliance where the appliance itself is modified minimally or not at all, but in which existing switches are used to impart information over the power conductors without the requirement for additional control lines.

The present invention can distinguish between the interruption of power at an external switch and the interruption of power at a switch located at the appliance and can react differently to the two events. The advantage of being able to distinguish between two different switch locations is that by having the ability for two different programming schedules, a single product can serve multiple roles. If a wall outlet is controllable from the room wall switch located near the door, then a lamp plugged into that wall outlet can be controlled to be on or off from toggling either the room light switch or by toggling the switch located at the lamp. With the power control device of the present invention, dimming may be implemented in some arbitrary number of steps by on/off control at the lamp and may be implemented using some different number of steps by on/off control at the light switch on the wall. Dimming steps may increase from minimum brightness to maximum brightness when controlled from the wall and may decrease from maximum to minimum when controlled at the lamp or vice versa. Although this example describes the control of dimming levels, the control method might be applied to timed lighting schedules, light level ramping, or light flashing.

The advantage of being able to implement two different control schedules may be illustrated by the situation of a lamp that is equipped with this invention. Suppose the electronic apparatus of this invention is designed so that when the lamp switch is first turned on, the applied power is at the 12% level so that the lamp acts as a night-light. Then when the switch is turned off and on in rapid succession, the lighting level may be increased to 25%, then 50%, and then 100%. Subsequent switch transitions then would not affect power level as long as they occurred relatively rapid and ended in the condition of the lamp switch being closed. The power level would remain at 100%. Whenever the lamp is turned off for a longer period, such as 4 seconds or more, the system resets and the next switch closure results in 12% power and the cycle repeats. Suppose that the electronic apparatus of this invention has also been designed to react differently to switch closures that occur to turn power on or off at the wall outlet to which the lamp is attached. For example, when power is applied from the wall outlet, the lamp has 100% brightness. Then an OFF/ON transition at the switch controlling the wall outlet signals to the lamp controller to reduce brightness to 50%, with subsequent toggling returning the lamp to 100% and then back to 50%. In other words, utilizing conventional on/off switches that are already in existence, two different control schemes may be implemented to control lamp brightness with a single control apparatus.

In the above example, having these two different control schemes might be desirable in a baby's room. During the night the lamp is adjusted to be at 12% power for use as a night-light. When it is time to change Baby's diaper, the lighting level may be increased slightly without making the light so bright as to awaken the baby. In an emergency or during daytime use, when having multiple lighting levels may be a nuisance, a wall switch controls the lighting to be full or half power. With multiple lamps attached to the same controllable outlet, global brightness control may be implemented at the wall mounted outlet switch while local brightness control may be implemented at each lamp. If polarity sensitive loads are used, then independent control of two such loads can be achieved using a single controller. This could have value, for example, in the separate power control of the left and right sides of an electric blanket having only two electrical conductors that connect it to a controller. Because two polarity sensitivity loads are used, power level indicators might be added to show the level chosen for each side.

OBJECTS AND ADVANTAGES

Prior art approaches to implementing a variable appliance power control on an appliance equipped with a two-position ON/OFF switch had the following disadvantages:
 i) require retrofit to the existing appliance cord;
 ii) require a direct connection to a manual switch;
 iii) obtain controller power parasitically (across a thyristor); and/or
 iv) are entirely disposed within a lamp socket or within a wall switch.

In contrast, the present invention has the following objects and advantages:
 a. Lamp dimming may be controlled by using either an existing switch that is on the lamp or by using a remote wall switch, or both;
 b. A different control method may be implemented using the wall switch as opposed to using a lamp switch with a single controller able to recognize the source of control and able to respond accordingly;
 c. It receives AC power directly from the AC source and does not rely upon the voltage drop across the switching device;
 d. It may be disposed entirely within the plug on an appliance cordset;
 e. It may be disposed entirely within a plug-in module into which an AC appliance may be inserted;
 f. It lends itself to low EMI switching methods and can deliver near full power to the load;
 g. It may be implemented at very low cost, thereby encouraging its widespread adoption;
 h. All manual switches and controls are external to the device so that the device has no moving parts;
 i. It requires only 3 external connections to implement a full system, namely: source, common and load; and
 j. It allows the independent control on a half cycle basis of two separate polarity sensitive loads using a single controller, with each polarity sensitive load being controllable at either the source or at the load.

Further objects and advantages of the present invention will become apparent from a consideration of the drawings and ensuing description.

SUMMARY OF THE INVENTION

A power level controller and method for an AC electrical appliance that can be implemented in the plug of the appliance, controlling power in response to switch closures on the appliance and/or remotely located switches that control via a switch controllable power outlet, or alternatively, may be implemented as a module into which an existing appliance is inserted, thereby providing a retrofit solution for appliance control. By using multifunction switches having steering diodes, multiple commands can be transmitted to the controller, all without the need for additional control wires, since all commands are superimposed on the two conductors that deliver power to the appliance. In addition, the independent control of two polarity sensitivity loads may be carried out. With implementations using integrated circuits, the internal electrostatic discharge diodes may be used for the power supply to yield a very low parts count system with minimal wiring between control element and load.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 2 depicts phase control at (a) 100%, (b) 50%, and (c) 25%;

FIG. 3 depicts full current cycling at (a) 50%, (b) 50%, and (c) 25%;

LIST OF REFERENCE NUMERALS

20—Alternating current source
21—Source side AC hot
22—Switch
23—AC neutral
24—Power controller
26—Control
28—Thyristor
29—Gate of thyristor
30—Appliance
32—Switch in appliance
33—Electrical load
34—Full wave bridge rectifier
35—Load-side hot conductor
36—AC dropping resistor
38—Zener diode
40—Filter capacitor
42—Bleed resistor
44—Microcontroller
46—Thyristor bypass resistor
48—Gate protection resistor
50—AC input to microcontroller
52—Load sense resistor
54—Timing input
56—Thyristor control
58—Load sense input
60—Normally closed source switch
61—Normally closed load switch
62—Power rectifier
63—Wall switch assembly
64—Multiple position wall switch
65—Multiple position load switch
66—ESD protection diode to Vdd
67—ESD protection diode to Vdd
68—ESD protection diode from Vss
69—ESD protection diode from Vss
70—First I/O pin on CMOS controller
72—Second I/O pin on CMOS controller
74—P channel MOSFET internal to microcontroller
75—P channel MOSFET internal to microcontroller
76—N channel MOSFET internal to microcontroller
77—N channel MOSFET internal to microcontroller
78—Input resistor
79—Input resistor
80—Input buffer
81—Input buffer
82—Switch to steering diode on source side
83—Switch to steering diode on source side
84—Steering diode on source side
85—Steering diode on source side
86—Source side switch assembly
87—Load side steering diode
88—Switch to steering diode on load side
89—Switch to steering diode on load side
90—Load side steering diode
91—Plug incorporating phase controller
92—Electric cord on appliance
94—Unmodified plug on electrical appliance cord
95—Multiposition switch in load
96—Module incorporating phase controller
97—Prongs on module
98—Outlet on module
100—Steering diode for level indicator
102—Steering diode for level indicator
104—Side A level indicator
106—Side B level indicator
108—Side A load
110—Side B load
112—Normally closed side A load side control switch
114—Normally closed side B load side control switch
116—Dual element load

DESCRIPTION OF THE PREFERRED EMBODIMENTS

The present invention is of a method and apparatus for appliance power control with the preferred embodiment being either as built into a plug and requiring no further modification to the appliance, or as an independent module which may be attached to a wall outlet and into which a conventional appliance may be plugged. The invention preferably utilizes a thyristor that is series connected with the load and that controls the amount of power and rate of application of power delivered to the appliance based upon programmed schedules. By sensing the ON/OFF toggling of a conventional two-position switch, located in the appliance itself, or by remotely controlling power to an outlet into which the appliance is connected, control states are sensed and appliance power is controlled accordingly. The preferred embodiments for this invention are as implemented in the plug of a two-wire cordset or as implemented in a plug-in module, into which an appliance such as a lamp, heater, or fan may be plugged. If, either within the appliance, external from the appliance, or both places, a more complicated, multiple pole switch that incorporates steering diodes is used, more complicated control methods may be implemented, still without requiring additional control wires over and above the already existing appliance power conductors.

Figure 1:
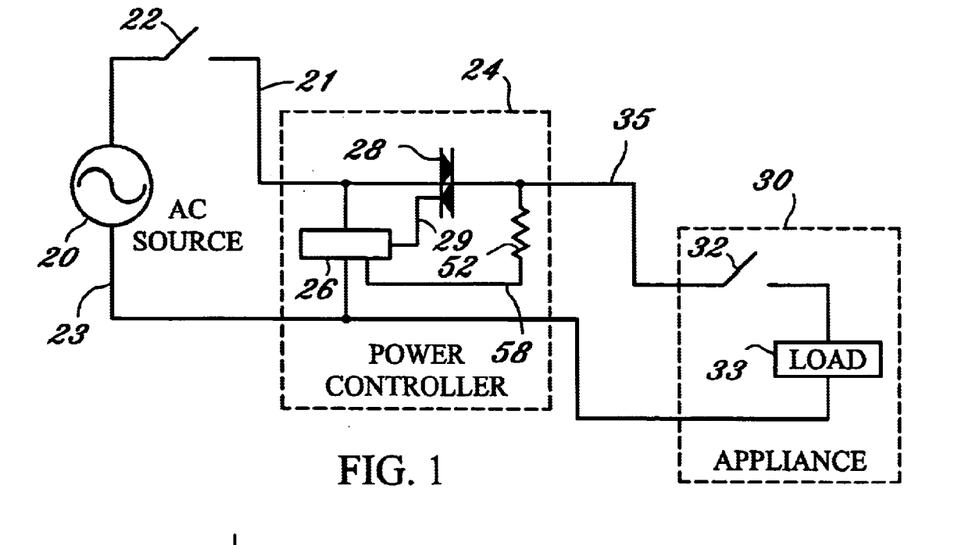
FIG. 1 is a block diagram of the appliance control system of the invention.

FIG. 1 portrays a block diagram of the present invention. An external alternating current source 20 furnishes electrical power to the system through the ungrounded or "hot" conductor 21 and the grounded or "neutral" conductor 23. This invention consists of a power control 24 that is inserted somewhere in the electrical circuit between the alternating current source 20 and the appliance 30. It is implemented as a three terminal device with the hot conductor 21 going into the power controller 24, the load-side hot conductor 35 coming out of the power controller 24 and with the third terminal connecting to the neutral conductor 23. It should be noted that the designations of "hot" and "neutral" are convenient for distinguishing parts of the circuit but do not make a material difference to the functioning of the power controller 24. In fact, the present invention may be applied to electrical systems having two ungrounded power conductors, in which case the system would not have a neutral conductor. A simple on/off switch 22, also known as a single pole single throw or SPST switch, may optionally be present on the source side of power controller 24. This switch 22 might represent, for example, a wall switch that applies or removes power from a wall outlet to which the power controller 24 is electrically connected. The power controller 24 serves to regulate the amount of power furnished to the appliance 30, by selectively firing the gate 29 of the thyristor 28. The appliance 30 is attached to the ac source 20 through the power controller 24. Within the appliance 30 is a SPST appliance control switch 32 and an electrical load 33. An example of an appliance 30 would be a table lamp having an on/off switch 32 and with the electrical load 33 being an incandescent light bulb. In a lamp load, a variable power would be used to control the brightness level in an incandescent light bulb. In heaters, power variations by the power controller 24 would be used to control the amount of heat delivered to the load 33. In a fan, phase control would be used to control the fan speed. Within the power controller 24 is the control 26 that would typically comprise a microcontroller together with necessary components to furnish power to the microcontroller. A load sense input 58 within the power controller 24 connects between the load-side hot conductor 35 and the control 26 through a resistor 52 and serves to allow the determination of whether the appliance 30 is drawing power at any particular time.

Figure 2A:
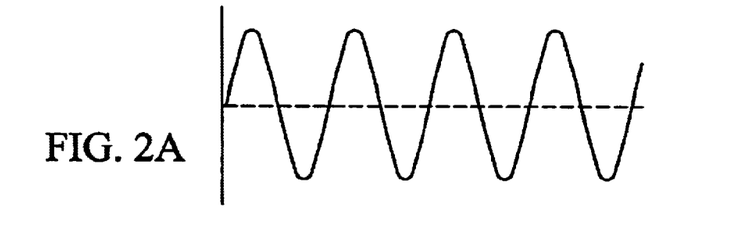
Figure 2B:
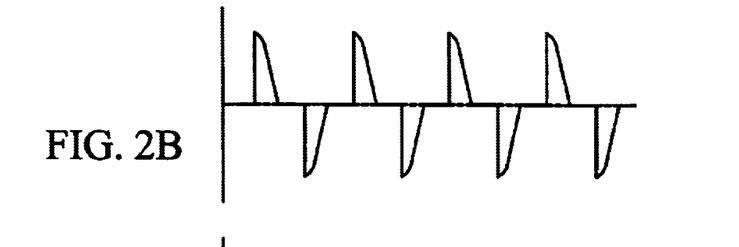
Figure 2C:
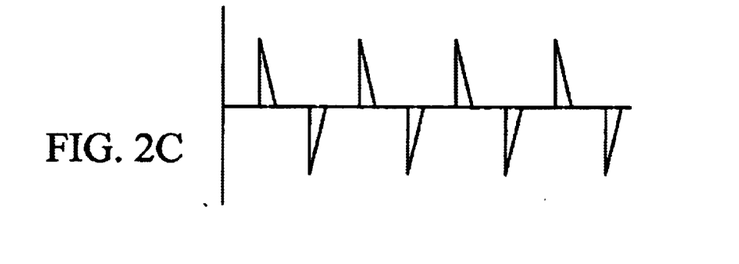

The power controller 24 controls the power delivered to the appliance 30 in one of two ways. First, it can implement phase control, whereby the thyristor 28 is turned on with a delay after each half cycle of the AC line. The electrical current that would be provided to the appliance 30 under three different phase control scenarios is depicted in FIG. 2. FIG. 2(a) depicts the appliance current if the thyristor 28 is continually fired. This yields substantially full power to the load. FIG. 2(b) depicts the appliance current if the thyristor 28 is fired at a phase angle of 45 degrees after each zero crossing. This corresponds to a 50% power condition. FIG. 2(c) depicts the appliance current if the thyristor 28 is fired at a phase angle of 60 degrees. This corresponds to a 25% power condition. One advantage to phase control is that the appliance 30 receives power for a portion of each half cycle. For a lamp, this is important because it avoids flicker. One disadvantage to phase control is that any time that the thyristor 28 is fired at a phase shift that is substantially different from the zero crossing, there is a sudden change in current flow (known as di/dt) and this rapid current change induces electromagnetic harmonics that are imposed upon the powerline and radiated from the powerline conductors 21 and/or 35 and/or 23. This is called electromagnetic interference or EMI. It can interfere with other electronic equipment and is objectionable in many situations.

Figure 3A:
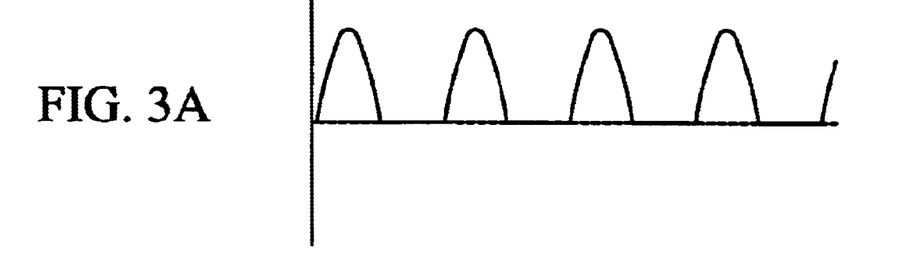
Figure 3B:
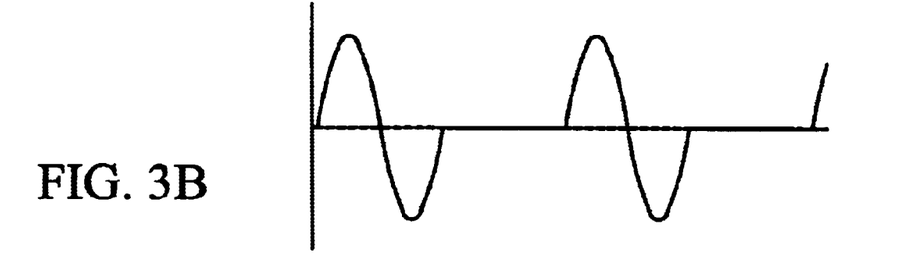
Figure 3C:
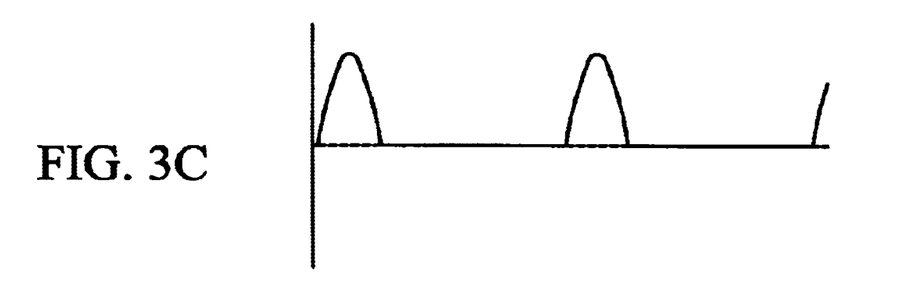

An alternative to phase control is full current cycling, whereby full power is applied for an integral number of half cycles and then power is removed for another integral number of half cycles and the ratio of the average on time, divided by the total time, yields the average power as a percentage of maximum power. This is depicted in FIG. 3 where FIGS. 3(a) and 3(b) both depict a possible scenario for 50% power and FIG. 3(c) depicts a possible scenario for 25% power. The advantage to full current cycling is that it produces very little EMI. The disadvantage to full current cycling is that it may induce low frequency phenomenon such as flicker in a lamp, or noisy operation in a fan. However, for appliance loads that are essentially heaters, full current cycling is preferable to phase control. On a start-up condition, it may be advantageous to apply power gradually using a full power cycling schedule. The reason for this is to avoid the electrical current inrush that occurs when power is directly applied to a cold heater filament, light bulb filament or stationary motor. By gradually applying power, the current inrush may be limited as the heater filament warms up and its resistance increases or as a motor begins to spin and the back electromotive force limits the current flow. By avoiding current inrush, the device may use a thyristor that is sized to the steady state load and this can result in a lower cost device.

Figure 4:
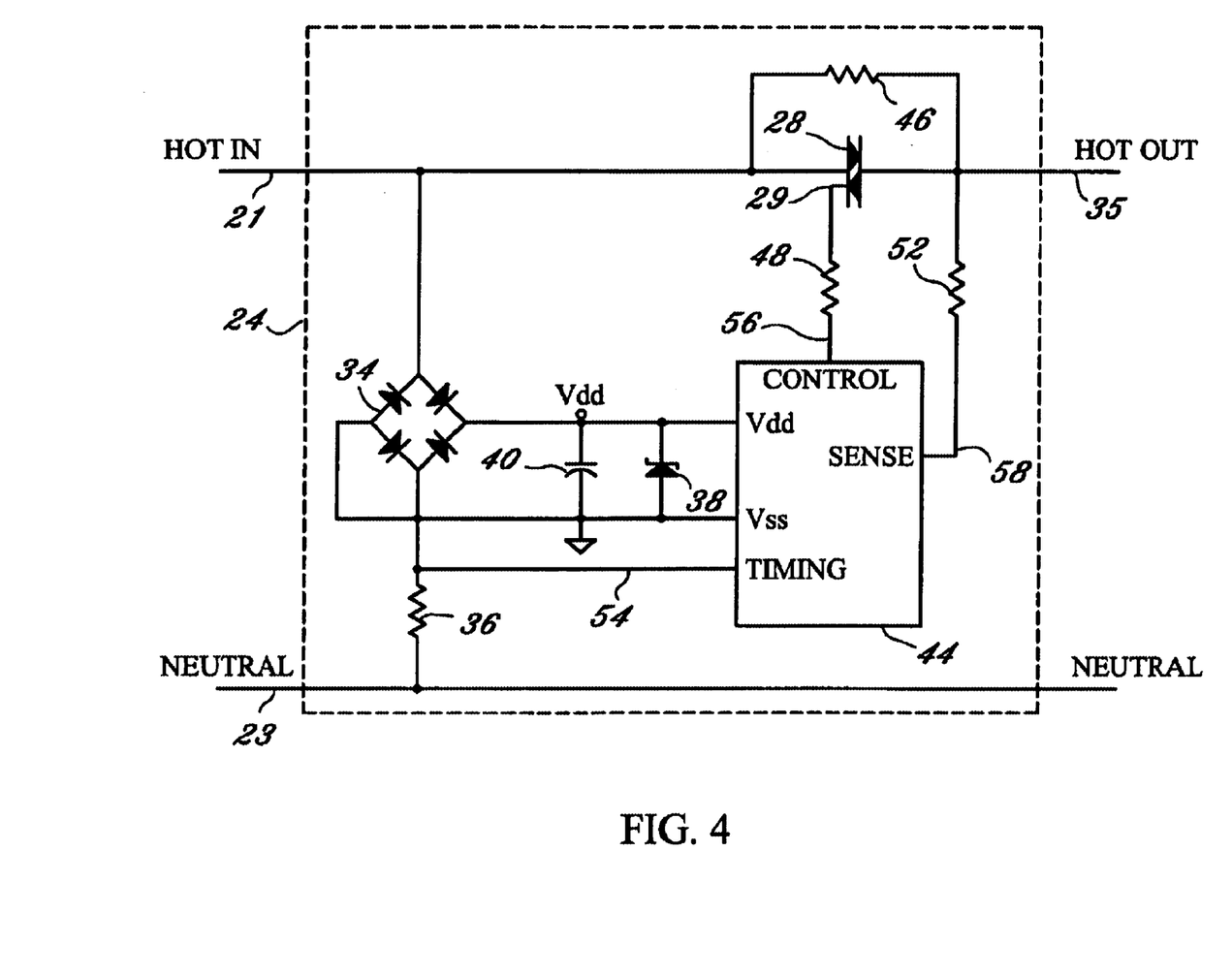
FIG. 4 illustrates a power controller embodiment of the present invention.

FIG. 4 depicts a specific embodiment of the power controller 24. A full wave bridge rectifier 34 comes off the incoming hot conductor 21 and then connects to the neutral conductor 23 through an AC dropping resistor 36. The AC dropping resistor 36 serves to shed a significant percentage of the input AC voltage to yield the significantly lower power supply voltage. The terms "hot" and "neutral" have significance only in a grounded system where the ungrounded conductor is called the hot conductor and the grounded conductor is neutral. It will be obvious to one skilled in the art that conductors 21 and 23 could be exchanged without impacting the function of the system.

A microcontroller 44 serves as the brains of the circuit and detects external switching events and controls the thyristor 28. Filter capacitor 40 serves to filter the rectified AC coming out of the full wave bridge rectifier 34 and to store charge. Zener diode 38 serves to clamp the input voltage to avoid overvoltages that could destroy the microcontroller 44. The microcontroller 44 implements phase control by firing thyristor 28 through pulses applied at the thyristor gate 29. Gate protection resistor 48 serves to limit gate current to the thyristor 28.

The microcontroller 44 uses two input pins and one output pin. The timing input 54 is derived directly from sampling the neutral wire 23 through the AC dropping resistance 36. Since the microcontroller power pin, Vdd, is clamped to the AC hot conductor 21 through the bridge rectifier 34, the timing input 54 alternately goes positive and negative relative to the microcontroller common, Vss. These excursions can be sensed from the timing input and detected by the microcontroller 44 when the potential at the timer input 54 crosses from Vss to Vdd and crosses back again. By doing so, the microcontroller 44 can detect the zero crossings of the AC waveform. If the timing input 54 detects a transition from low to high then this corresponds to the beginning of a negative half cycle of the applied AC power. If the timing input 54 detects a transition from high to low then this corresponds to the beginning of a positive half cycle.

In FIG. 4, the sense input 58 is used to detect the presence of an appliance load. This serves to recognize whether the appliance load is turned off or on. The control line 56 is always controlled to be in a high impedance state near the end of each half cycle and continuing into the beginning of the next half cycle. This ensures that the thyristor 28 is briefly in an off condition at each zero crossing. When the timing input 54 detects that a new half cycle has begun, the sense input 58 checks for whether the voltage is high or low. In a positive half cycle, if a low voltage is sensed at sense input 58, this indicates that a low impedance path to neutral 23 exists, which is characteristic of a load so the load is assumed to be turned on. In a positive half cycle, if a high voltage is sensed at sense input 58, this is due to thyristor bypass resistor 46 which has a relatively high value of resistance (too high to deliver significant power to a turned on load) and there is not a low impedance path to neutral 23. Hence the load is assumed to be off. In a similar way, in a negative half cycle, a high at sense input 58 is indicative of a load that is turned on and a low at sense input 58 is indicative of a load that is turned off. It should be noted that depending upon the thyristor, the leakage through the thyristor might serve to play the role of the thyristor bypass resistor 46, in which case, no such external resistor is required.

Based upon the state of the load, either switched on or switched off, the state of the input voltage (either positive or negative), and the programmed control functions, the thyristor gate 29 is controlled to turn on the thyristor 28.

Figure 5:
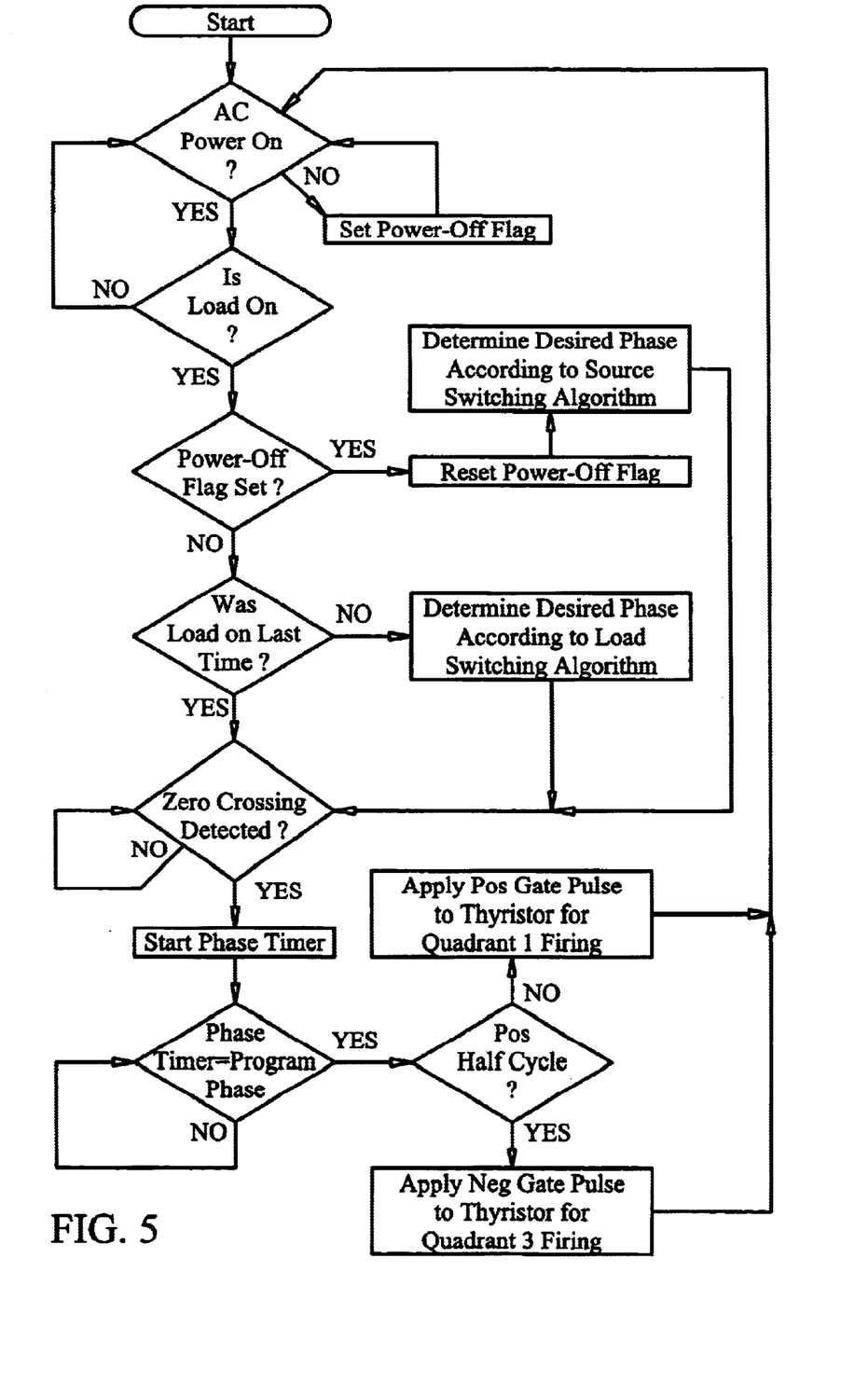
FIG. 5 is a flowchart of the preferred power control method of the invention.

FIG. 5 depicts a control method that can be used to implement power control by the phased firing of the thyristor 28. From start, the microcontroller checks if AC power is on. If the source power is detected as being off, this is indicative that switch 22 in FIG. 1 is off and a power-off flag is set. If the source switch 22 is off for an excessive amount of time, then the filter capacitor 40 from FIG. 4 goes into a discharged condition, power is removed from the microcontroller and the power controller 24 is dormant until the next application of power. If, however, the off time is short, such as the amount of time that a user might be expected to toggle the source switch 22 off then on again, then this is recognized as a control signal and when the switch is placed into an on position, the control is taken from the source switch. What is being controlled is an index that determines how much of a delay after the zero crossing should be made before firing the thyristor (for phase control), or what percentage of integral half cycles should be fired (for full current cycling). By the same token, in the method in FIG. 5, it is seen that if the load power is interrupted, as in the toggling of a load switch from on to off to on again, this is recognized as a control signal and the power index is set according to a load switching method, which may be an entirely different method from the source switching method.

As a side feature, when power is first applied to a load, it may be applied gradually, under the power controller's control, in order to avoid the current inrush that occurs when a cold heater filament or lamp filament is subjected to full power. When the heater or the lamp filament increases in temperature, the resistance will increase, which will have a self-regulating effect and will serve to control electrical current levels to design values. Accordingly, whereas the controlling thyristor 28 would have to be sized to withstand a relatively high inrush current in an application where there was no intelligence built into the power controller, in the present system, the ability to ramp up the power when it is first applied, allows the manufacturer to match the thyristor size to the nominal power requirements, without having to account for momentary current overages. This can result in a cost reduction in the thyristor that is used.

With phase control, each time that a zero crossing is detected, it is used as a marker against which the phase index is compared. When a sufficient amount of time has elapsed so that the phase timer equals the programmed phase, then the thyristor 28 is fired with the appropriate polarity of gate signal.

The method for power level control using full current cycling is similar to that of the method using phase control as described in conjunction with FIG. 5. With full current cycling, each time that a zero crossing is detected, an on count is compared against a total count. Depending on the desired power level, a determination is made at the beginning of each half cycle to either fire the thyristor 28 or to leave it off for the balance of the half cycle.

Figure 6:
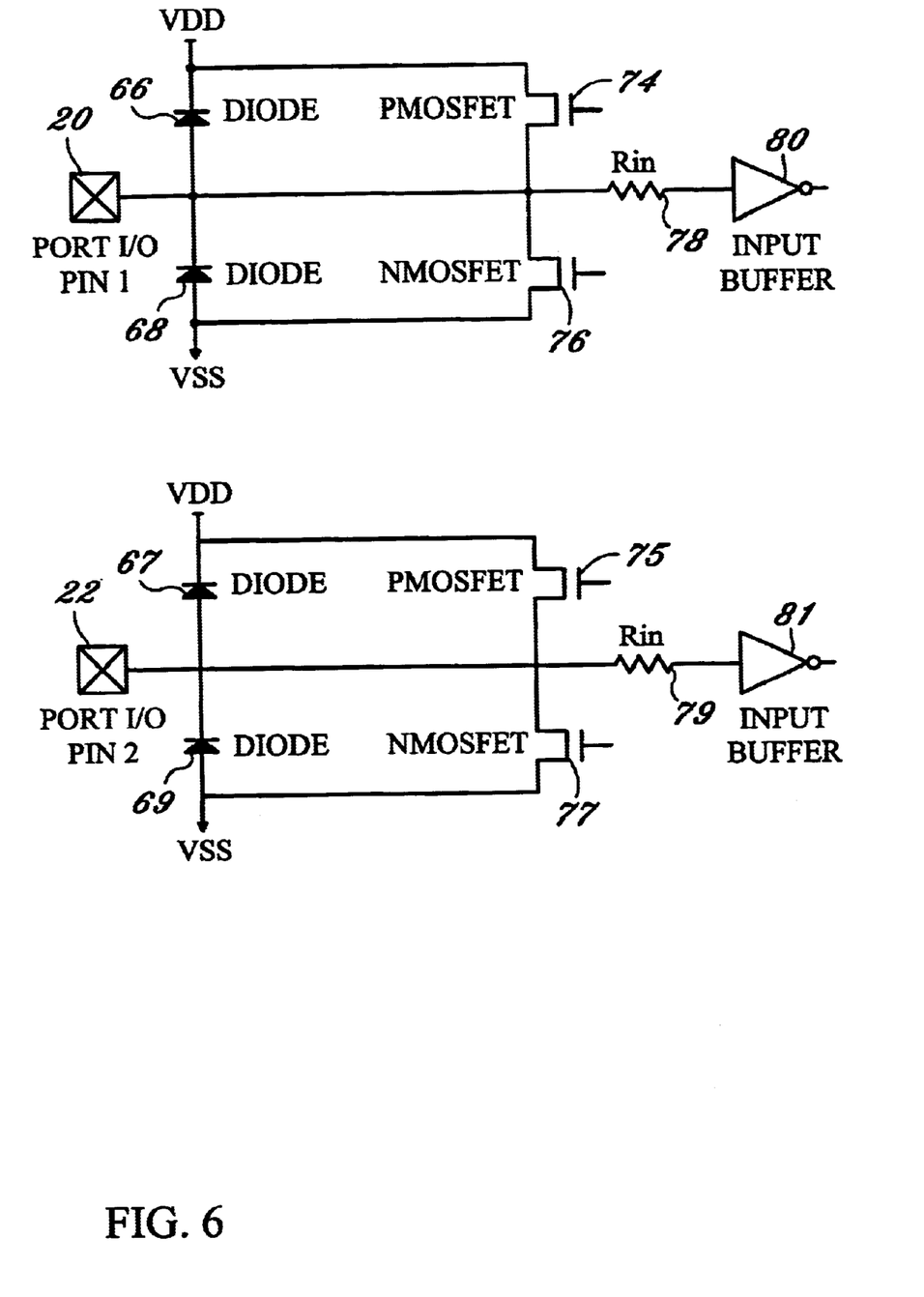
FIG. 6 illustrates the CMOS I/O structure of the invention with ESD diodes.

By making use of the electrostatic discharge (ESD) protection diodes that are commonly built into the input-output (I/O) pins of off-the-shelf complementary metal oxide (CMOS) integrated circuits, including CMOS microcontrollers, the circuit of FIG. 4 may be simplified. Such simplifications are important in order to arrive at the absolute minimum parts count and consequently the absolute minimum cost. FIG. 6 depicts two I/O pins 20, 22, and the associated internal ESD diodes, input buffers and output drivers. In a CMOS microcontroller, the I/O pins are generally internally selectable under program control to be either high impedance (using buffers 80 and 81) inputs or to be output drivers. If a given I/O pin is chosen to be an output, then the MOSFET transistors 74 and 76 for I/O pin 20, and transistors 75 and 77 for I/O pin 22 are used to drive the output to either the positive power supply potential Vdd or to the negative power supply potential Vss. Diodes 66 and 67 serve to clamp I/O pins 20 and 22 respectively to the Vdd power supply bus that is internal to the microcontroller. The purpose of these diodes is to serve as a low impedance path to Vdd in case a high voltage potential is applied to an I/O pin, and these diodes thereby protect the transistors 74 and/or 75 from being destroyed due to unintentional electrostatic discharge. In a similar way, the internal diodes 68 and 69 serve to clamp I/O pins 20 and 22 respectively to the Vss bus in the case that a potential that is more negative than Vss is applied at one of the I/O pins.

By applying a current limited AC waveform between I/O pin 1 20 and I/O pin 2 22, the ESD diodes can be used to implement a full wave bridge rectifier. In other words, ESD diodes that are already internally present in many CMOS integrated circuits, and in particular, in most CMOS microcontrollers, may be used to replace the external rectification elements commonly been used to rectify the AC power supply to generate the DC power supply used by the integrated circuit and other components of an electronic circuit.

Figure 7:
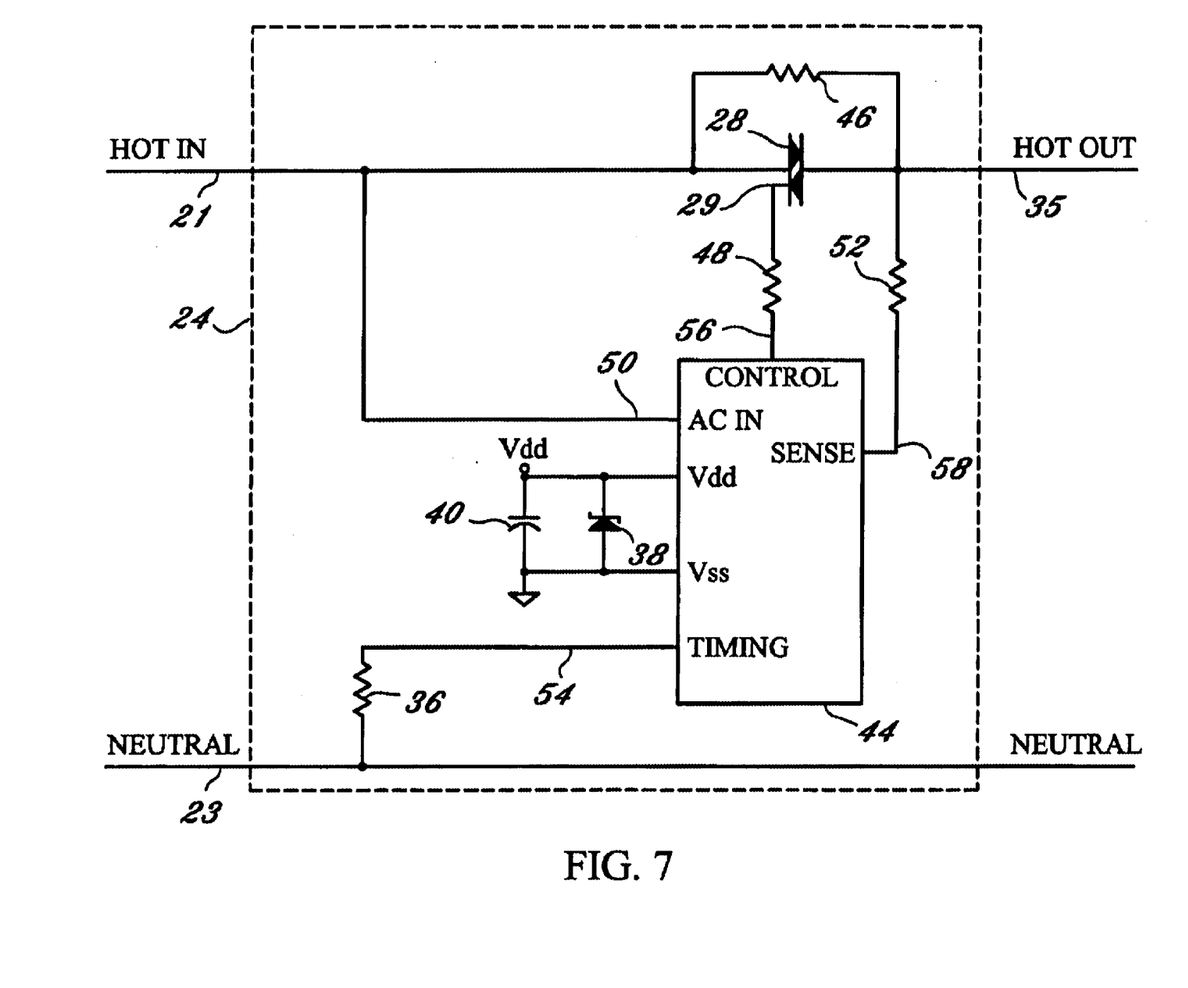
FIG. 7 illustrates use of a microcontroller utilizing ESD diodes for rectification.

FIG. 7 depicts a low parts count implementation based upon a CMOS microcontroller like the PIC12C508, which is manufactured by Microchip Technology Incorporated, wherein the ESD diodes that are built into the I/O pins are exploited to implement full wave rectification. This implementation assumes that the microcontroller 44 has an internal clock/oscillator to sequence instructions that have been stored internally in read only memory or ROM. In this implementation, a conductor 50 goes directly into an I/O pin on the microcontroller 44. The other AC input comes in from the neutral 23 via dropping resistor 36 into the timing input 54. In comparing FIG. 7 to FIG. 6, the input labeled AC IN 50 in FIG. 7 corresponds to I/O pin 1 20 in FIG. 6 while the input labeled TIMING 54 in FIG. 7 corresponds to I/O pin 2 22 in FIG. 6. Although not explicitly shown in FIG. 7, the ESD diodes then serve to rectify this AC to generate a D.C. voltage at Vdd relative to Vss. As before, the capacitor 40 serves to filter the rectified AC and to hold up the D.C. power during momentary outages. The zener diode 38 serves to regulate the power supply voltage. The four diodes built into the ESD structures of the two I/O pins perform the function of a bridge rectifier. When the AC IN pin 50 is more positive than Vdd, internal ESD diode 66 will conduct. When the TIMING pin 54 is more positive than Vdd, internal ESD diode 67 will conduct. When the AC IN pin 50 is more negative than Vss, ESD diode 68 will conduct. When the TIMING pin 54 is more negative than Vss, ESD diode 69 will conduct. In this way, when the instantaneous AC voltage applied is greater than the charge stored on the capacitor 40, the ESD diodes 66, 67, 68, 69 conduct and maintain the power supply voltage.

Once the power supply voltage has been established, the ESD diodes only conduct during the interval when the applied AC voltage is greater than the sum of the power supply voltage plus the voltage drops of diode 66 and 69. Because of this, gate current for the thyristor would normally only be available while one of the ESD diodes is conducting to form a conduction path for the gate circuit.

This is satisfied for most of each half cycle, but not near the zero crossings. To allow gate current anywhere, even at the zero crossing, an alternate conduction path must be provided around each of the ESD diodes 66, 69. This is accomplished by enhancing the MOSFET in parallel to the diode that would conduct to the hot conductor 21, while applying the appropriate gate voltage to the thyristor. The gate circuit for the thyristor is now completed with gate current being provided by the filter capacitor 40. If port 20 is connected to the hot conductor 21, it is also connected to the thyristor's MT1 terminal. If the I/O port connected to the thyristor's gate 29, is port 22, and a positive gate voltage is required, then PMOSFET 74 will be enhanced on port 22 while the NMOSFET 76 on port 20 will also be enhanced. This connects the VSS end of capacitor 40 to the hot in 21, and the MT1 terminal of the thyristor 28, while applying VDD to the gate. By synchronously controlling the AC input port and the thyristor gate 29, the present invention implements synchronous rectification as well as having complete control over the thyristor 28.

Figure 8:
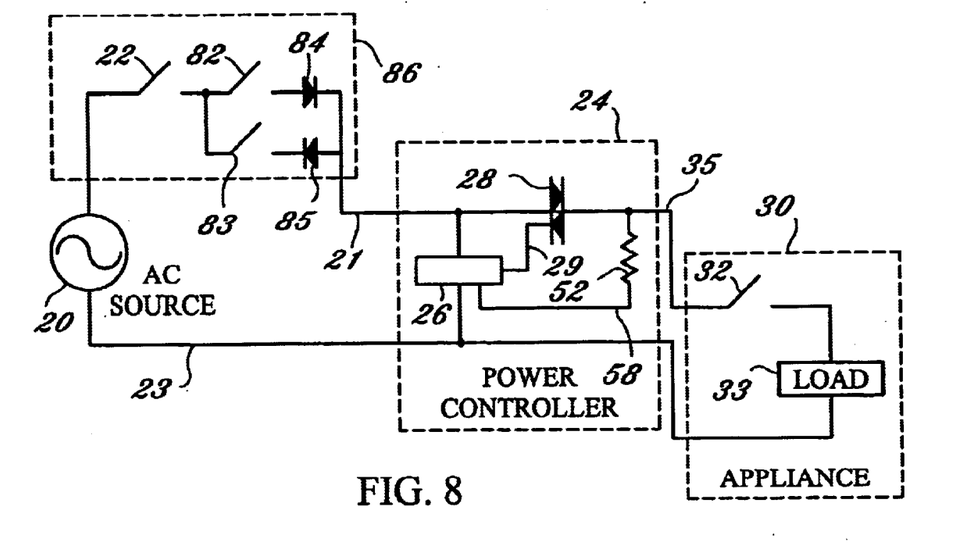
FIG. 8 illustrates two-wire control using steering diode control information.

FIG. 8 depicts another embodiment wherein a special switch 86 is used at the source side. This switch utilizes one or more steering diodes 84 and/or 85 to impart control information to the power controller. If switches 82 and 83 are both left in a closed position, the circuit function as did the source switch 22 is as described previously in reference to FIG. 1. Now assume that switch 22 is left in a closed position. By keeping switch 83 in a closed position and momentarily opening switch 82, for this brief period only negative half wave power is applied to the power controller 24. The power controller 24 can detect this negative half wave condition and this information used to decide which control method to use. By the same token, by keeping switch 82 closed and momentarily opening switch 83, a momentary application of positive half wave power is applied to the power controller 24 and the load and this can be used to signal a different control method. For example, a half wave rectified positive source could indicate that the power controller 24 is to turn on full power for one hour and then turn off the power. The momentary application of half wave rectified negative source could be used to signal to the power controller 24 to blink the lights. If power is fully toggled on then off, by leaving switches 82 and 83 closed and then momentarily opening switch 22 and then closing switch 22 again, this might signal to the power controller 24 to decrease the power delivered to the load according to a preprogrammed series of steps. It is easily seen that various control signals may be imparted to the power controller 24, but in all instances, the power controller 24 requires no dedicated control wires but simply uses the two power wires used by any conventional electrical appliance. In particular, the control is no longer binary (a series of off and on) but now becomes multilevel since control signals can be off, on positive, on negative and fully on. One of the advantages to the implementation in FIG. 8 is that if the source switch controls the power to multiple outlets, then to implement the power control of a lamp through toggling the power on and off might be objectionable since power would be disrupted for every appliance that is tied to the source through the source switch. However, by keeping the source switch 22 in a closed position and then having switches 82 and 83 in normally closed positions with momentary openings to broadcast control signals, the effect is to at least be applying half wave power to all appliances during the momentary power disruptions that are used for control.

Figure 9:
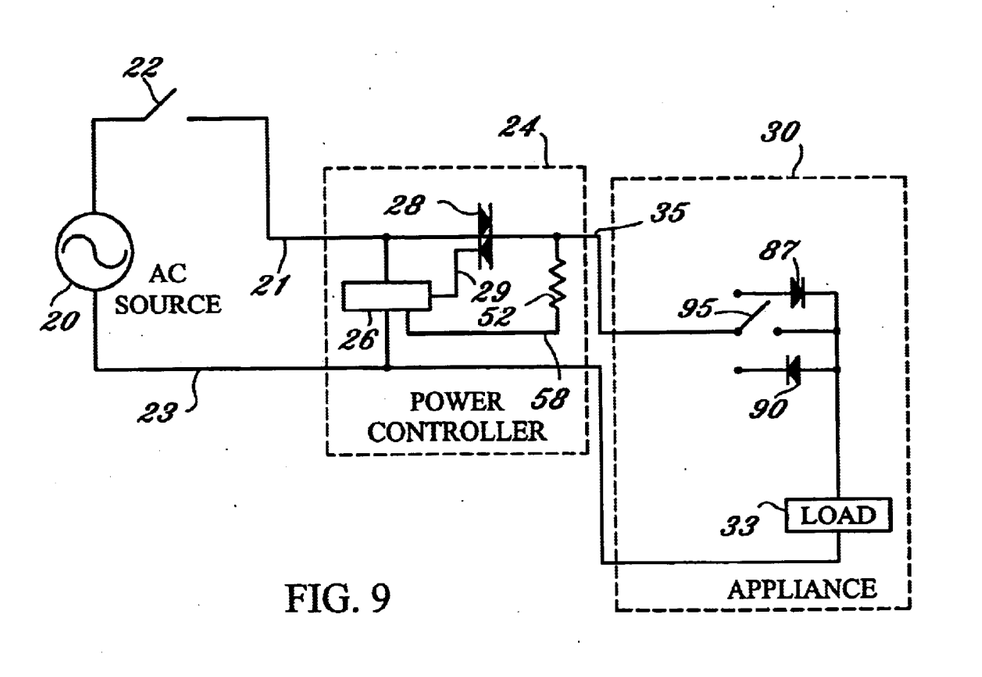
FIG. 9 illustrates a second embodiment of two-wire control using steering diode control information.

FIG. 9 depicts an implementation wherein the switch in the appliance is a multiposition switch 95, in this case, a single pole, four throw switch that can be fully on, fully off, or can engage steering diodes 87 or 90 to deliver half wave power to the appliance. Since the power controller 24 can detect when the load current is flowing to the appliance and can detect when a positive (or negative) half cycle of source power is being applied, the power controller 24 can detect the switch 95 position in the appliance and can use that information to implement alternative control schemes. Rather than operate the appliance in a half wave mode, the multiposition switch 95 would normally be in a full on position, with momentary touches to the steering diodes 87 and 90 to convey information to the power controller 24. Depending upon the switch position and the sequence of switch closures, the power controller 24 can be controlled to do a variety of tasks. For example, by moving switch 95 to a fully off and then fully on position, that might tell the controller to increase the duty cycle of the applied power by 10%. Multiple off/on contact closures could serve to ramp up the power from zero to 100% in 10% increments until the power delivered by the power controller 24 was 100%. At any time, a momentary closure of switch 95 to steering diode 87 might be used to signal to the power controller to decrease the power by a 10% step. At any time, a momentary closure of switch 95 to steering diode 90 might be used to signal to the power controller to deliver 50% power, no matter what the previous state.

Figure 10:
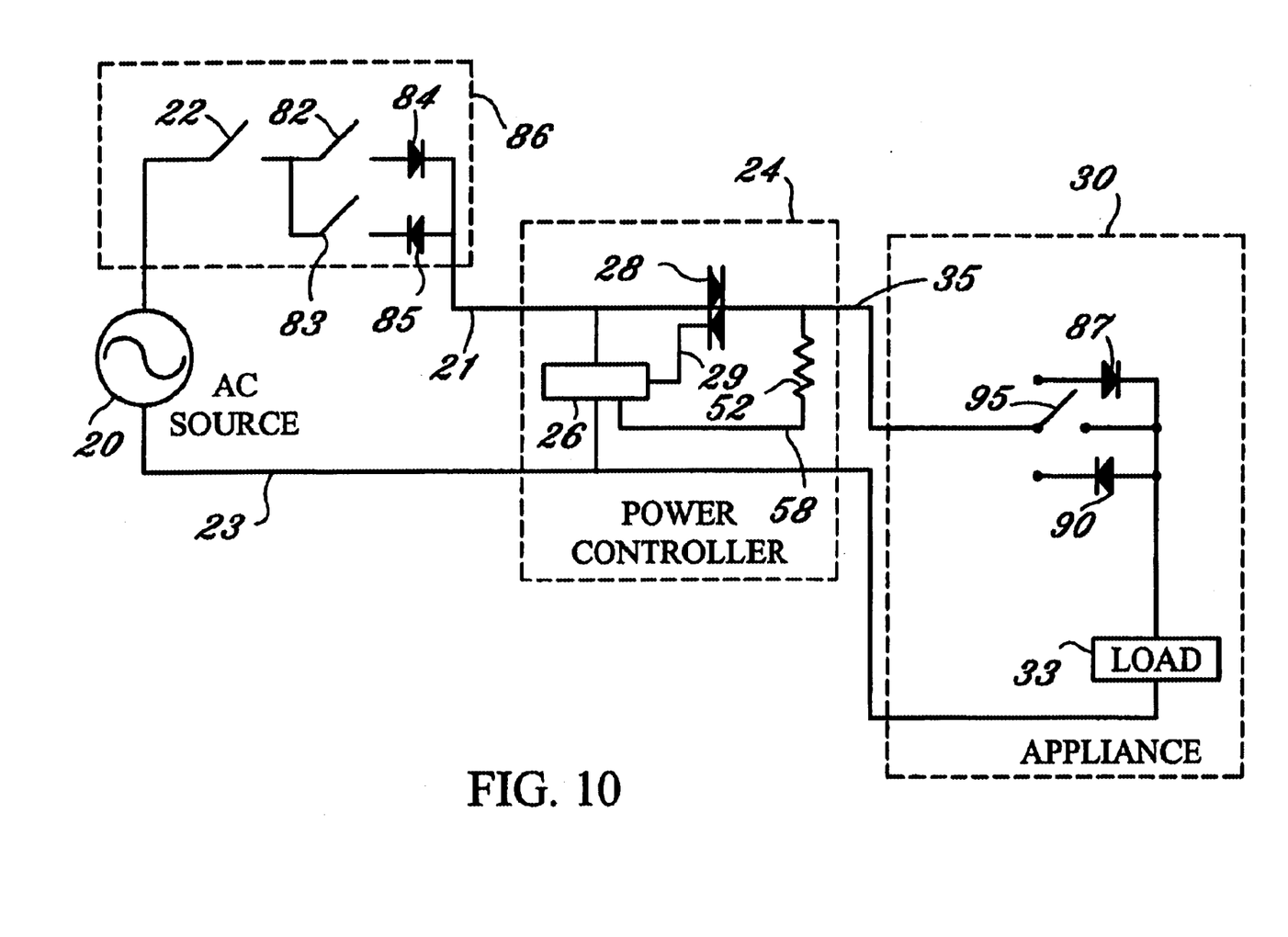
FIG. 10 illustrates two-wire control using multifunction switches at both the source and at the load.
Figure 11:
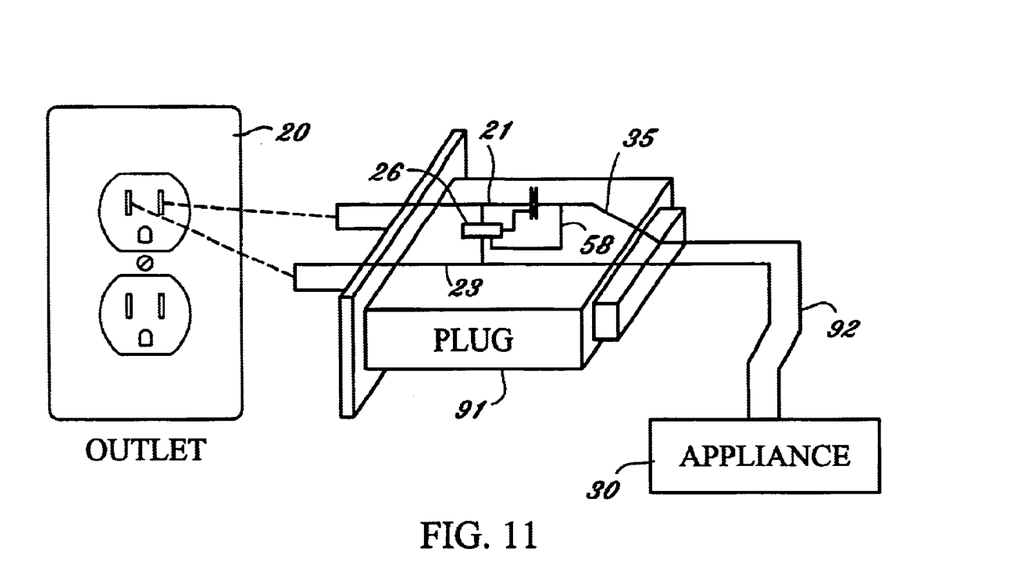
FIG. 11 illustrates use of a power controller completely disposed in a two-prong electrical plug.

FIG. 10 depicts an embodiment of the invention where special switches are used at both the source side and in the appliance to communicate control signals over the two power line wires 23 and 21/35. In this embodiment, the power controller 24 can sense the state of the source-side switch assembly 86 by monitoring the power that is supplied to the controller 24. This is accomplished as noted in the discussion of FIG. 8. The power controller can also sense the state of the multiposition switch 95 that is located in the appliance as noted in the discussion of FIG. 9. Because switch positions in the source side switch assembly 86 affect the power controller 24 in a different way than the various switch positions in the multiposition switch 95 at the appliance, the power controller 24 can distinguish the various positions of switch 95 from the various positions of switch 86. By combining all of the various permutations of switch position and time histories of switch opening/closure for source switch and appliance switch, it is possible to implement very sophisticated control methods FIG. 11 depicts the two-wire power controller as disposed entirely within the plug on an appliance cordset. Electrical cord 92 is a two-wire cord that delivers power to the appliance. The phase controller of the present invention is entirely disposed within the plug 91. Since the invention is all electronic with no moving parts, it can be molded within a conventionally sized plug housing and can be made to look indistinguishable from an ordinary appliance plug.

Figure 12:
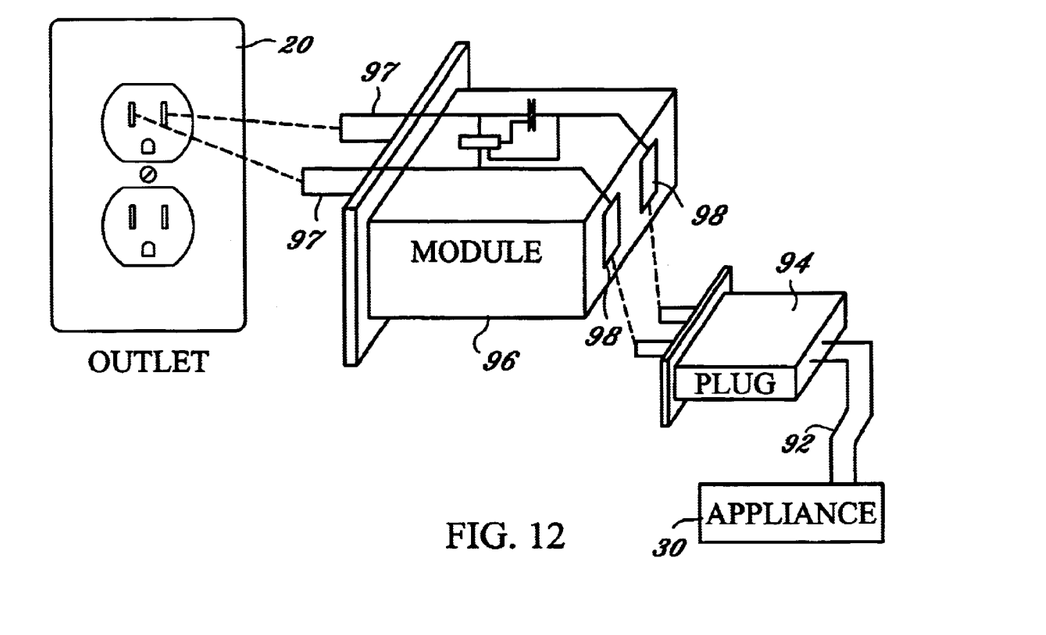
FIG. 12 illustrates use of a power controller completely disposed in a plug-in module.

FIG. 12 depicts an alternative packaging scheme for the two-wire phase controller wherein it is entirely disposed in a plug-in module 96. The plug-in module 96 has two prongs 97 by which it may connect to an electrical outlet to receive AC power. The plug-in module 96 has two holes 98 into which a conventional plug 94 from a conventional AC appliance may be inserted to source power to the appliance. The advantage to the implementation in FIG. 12 is that it represents a retrofit solution to supplying controllable power or other functions to an existing appliance 30 having a conventional plug 94, with control signals generated through switch closures of a switch (not shown) that is already built into the appliance.

Figure 13:
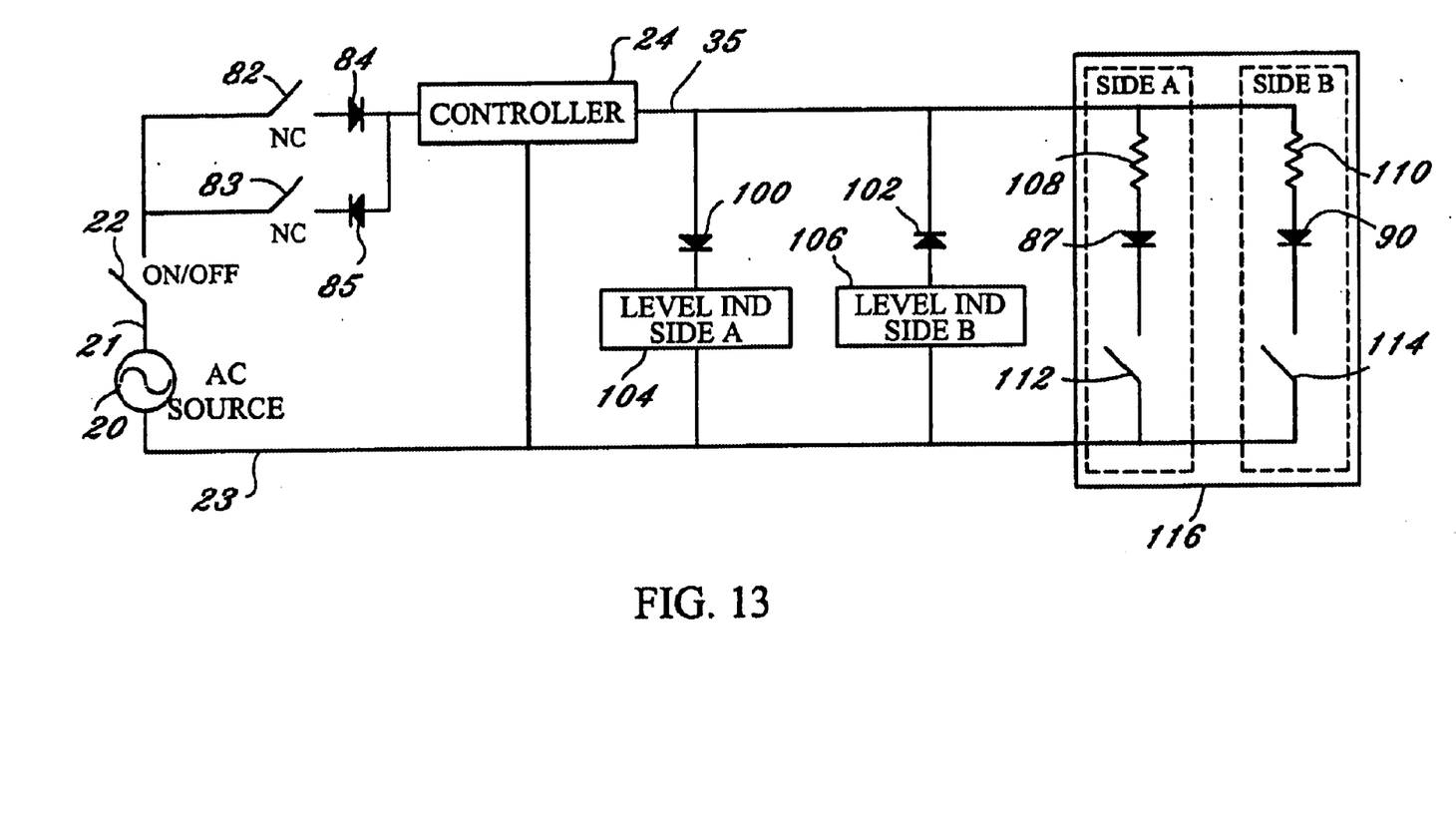
FIG. 13 illustrates dual independent control of two polarity sensitivity loads using a single controller.

FIG. 13 illustrates independent control of two polarity sensitive loads using a single controller. In this example, each side of a dual element load 116 is controlled independently of the other side and this control can be carried out either at the load or at the source, with only two electrical conductors connecting the dual element load 116 to the controller 24. The value of this implementation, for example, is as used for an electric blanket, where two individuals might want to have their own temperature setting. A master on/off switch 22 controls all power to the system. Switches 82 and 83 are normally closed switches, located near the source, that are used to impart control information when momentarily opened. By momentarily opening switch 82, only negative half wave power will be supplied to the controller 24 and this can be interpreted by controller 24 as a command signal. By momentarily opening switch 83, only positive half wave power will be supplied to the controller 24 and this can be interpreted by controller 24 as a second type of command signal. For example, toggling switch 82 could be used to deliver commands to the controller 24 in reference to side A load 108 and toggling switch 83 could be used to deliver commands to the controller 24 in reference to side B load 110. Controller 24 can deliver power exclusively to the side A load 108 by only applying positive half cycle power, in which case the side A indicator 104 would be lit. Similarly, controller 24 can deliver power exclusively to the side B load 110 by only applying negative half cycle power, in which case the side B indicator 106 would be lit. By applying phase control to the positive half cycles, the power to side A load 108 can be controlled to range from close to zero to some maximum value. When the side A level indicator 104 receives less than the maximum power, it will indicate a lower level of brightness (if implemented using a neon or LED indicator). In a similar way, by applying phase control to the negative half cycles, the power to side B load 110 can be controlled independent from side A load 108, even though both loads receive power from the same two electrical conductors 35 and 23. The level indicators 104 and 106 may be implemented with LED's, neons, bar graphs or meter movements.

In the dual element load 116, two normally closed switches 112 and 114 are used to give local control by sending signals to the controller 24. Switches 112 and 114 can be manually controlled, in which case they could represent a user's input, or they could be implemented by a temperature controlled actuator, in which case they could represent a means to send information to the controller, again using only the two electrical conductors 35 and 23 connecting controller 24 to dual element load 116. Although in FIG. 13, the level indicators 104 and 106 are depicted as being physically located between the dual element load 116 and the controller 24, it should be noted that they could also be placed either entirely within the dual element load 116 or entirely within the controller 24 or could be omitted altogether, without adversely affecting the control.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The teachings of all applications, articles, patents and other references mentioned above are herein incorporated by reference.

What is claimed is:

1. A control apparatus for electrical appliances having a plug, a load, and requiring no more than two electrical current conductors connecting said plug to said load, said apparatus comprising:

circuitry to determine the state of a multiposition switch that is located in close proximity to the load and that is in electrical series with the load;

circuitry to determine the state of a multiposition switch that is located external to the appliance and that controls source power at a wall outlet or distribution strip; and a thyristor to control the application of power to the appliance in response to information provided by the states of either or both of said two multiposition switches; and wherein said apparatus is portable with an appliance after installation.

2. The control apparatus of claim 1 wherein said apparatus is entirely disposed within the plug of the appliance cordset.

3. The control apparatus of claim 1 wherein said apparatus is entirely disposed within a plug-in module.

4. The control apparatus of claim 1 wherein said multiposition switches are single pole single throw switches.

5. The control apparatus of claim 1 wherein said multiposition switches utilize steering diodes to allow said control apparatus to implement different control actions depending upon which switch position settings are used.

6. The control apparatus of claim 5 wherein control signals are provided by each multiposition switch selected from the group consisting of: off, on positive, on negative, and fully on.

7. The control apparatus of claim 6 wherein a sequence of control signals is used to determine control actions.

8. The control apparatus of claim 1 wherein said control of the application of power to the load is effected by firing the gate of the thyristor.

9. The control apparatus of claim 8 wherein said thyristor is fired in quadrants I and III.

10. The control apparatus of claim 1 wherein said load is selected from the group consisting of heaters, lights, and electric motors.

11. The control apparatus of claim 1 wherein said load and said multiposition switch which is in close proximity to the load comprise an electric appliance.

12. A control method for electrical appliances having a plug, a load, and requiring no more than two electrical current conductors connecting the plug to the load, the method comprising the steps of:

determining the state of a multiposition switch that is located in close proximity to the load and that is in electrical series with the load;

determining the state of a multiposition switch that is located external to the appliance and that controls source power at a wall outlet or distribution strip; and controlling with a thyristor the application of power to the appliance in response to information provided by the states of either or both of the two multiposition switches; and wherein the steps of the method are executed by a device portable with an appliance after installation.

13. The control method of claim 12 wherein the thyristor is disposed within the plug.

14. The control method of claim 12 wherein the thyristor is disposed within a plug-in module.

15. The control method of claim 12 wherein the multiposition switches are single pole single throw switches.

16. The control method of claim 12 additionally comprising the step of utilizing steering diodes in the multiposition switches to implement different control actions depending upon which switch position settings are used.

17. The control method of claim 16 wherein in the utilizing step control signals are provided by each multiposition switch selected from the group consisting of: off, on positive, on negative, and fully on.

18. The control method of claim 12 wherein in the controlling step control of application of power to the load is effected by firing a gate of the thyristor.

19. The control method of claim 18 wherein the thyristor is fired in quadrants I and III.

20. The control method of claim 12 wherein the load is selected from the group consisting of heaters, lights, and electric motors.

21. The control method of claim 12 wherein the load and the multiposition switch which is in close proximity to the load comprise an electric appliance.

* * * * *